US011148693B2

(12) United States Patent
Teshima et al.

(10) Patent No.: US 11,148,693 B2
(45) Date of Patent: Oct. 19, 2021

(54) PLATOON TRAFFIC SYSTEM AND PLATOON TRAFFIC CONTROL METHOD

(71) Applicant: HITACHI, LTD., Tokyo (JP)

(72) Inventors: Hisanori Teshima, Tokyo (JP); Kojin Yano, Tokyo (JP); Shuichiro Sakikawa, Tokyo (JP); Takahiro Matsushita, Tokyo (JP); Jun Yamazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 168 days.

(21) Appl. No.: 16/632,263

(22) PCT Filed: May 17, 2018

(86) PCT No.: PCT/JP2018/019023
§ 371 (c)(1),
(2) Date: Jan. 17, 2020

(87) PCT Pub. No.: WO2019/021589
PCT Pub. Date: Jan. 31, 2019

(65) Prior Publication Data
US 2020/0361503 A1 Nov. 19, 2020

(30) Foreign Application Priority Data

Jul. 26, 2017 (JP) .............................. JP2017-144309

(51) Int. Cl.
*G05D 1/00* (2006.01)
*B61L 27/00* (2006.01)

(52) U.S. Cl.
CPC ....... *B61L 27/0027* (2013.01); *B61L 27/0005* (2013.01)

(58) Field of Classification Search
CPC ............. B61L 27/0027; B61L 27/0005; B61L 27/0016; B61L 21/10; B61L 2210/02;
(Continued)

(56) References Cited

U.S. PATENT DOCUMENTS

2015/0294430 A1* 10/2015 Huang .................. B60W 10/18
705/7.24
2017/0043776 A1* 2/2017 Sujan .................... F02D 41/021
(Continued)

FOREIGN PATENT DOCUMENTS

JP  2000264210 A  9/2000
JP  2000285366 A  10/2000
(Continued)

OTHER PUBLICATIONS

Corrected Version International Search Report and Written Opinion for related International Application No. PCT/JP2018/019023, dated Jan. 28, 2020; English translation provided (15 pages).

*Primary Examiner* — Shardul D Patel
(74) *Attorney, Agent, or Firm* — Procopio, Cory, Hargreaves & Savitch LLP

(57) ABSTRACT

A platoon traffic system includes a plurality of platoons including vehicles on and from which passengers board and exit, and an operation management apparatus setting an operation schedule including assignment of the vehicles to the plurality of platoons and management thereof. The vehicles in each of the platoons integrally operate in accordance with the operation schedule along a track including boarding and exiting points where passengers board and exit the vehicles The operation management apparatus accepts a boarding request for the vehicles, the request specifying the boarding and exiting points, and changes the operation schedule to reassign the vehicles belonging to the plurality of platoons, among the platoons based on the boarding request and numbers of passengers allowed to board the vehicles.

8 Claims, 12 Drawing Sheets

(58) Field of Classification Search
CPC .......... B61L 27/04; G08G 1/22; G08G 1/127; G08G 1/00; B60L 15/40; G05D 1/00
USPC .......................................................... 701/19
See application file for complete search history.

(56) References Cited

U.S. PATENT DOCUMENTS

2017/0080963 A1* 3/2017 Morita ................ B61L 27/0077
2018/0084511 A1* 3/2018 Wu ......................... H04L 67/12

FOREIGN PATENT DOCUMENTS

| | | |
|---|---|---|
| JP | 2001101584 A | 4/2001 |
| JP | 2001266286 A | 9/2001 |
| JP | 2002-207796 A | 7/2002 |
| JP | 2003016575 A | 1/2003 |
| JP | 2015182653 A | 10/2015 |

\* cited by examiner

FIG.6

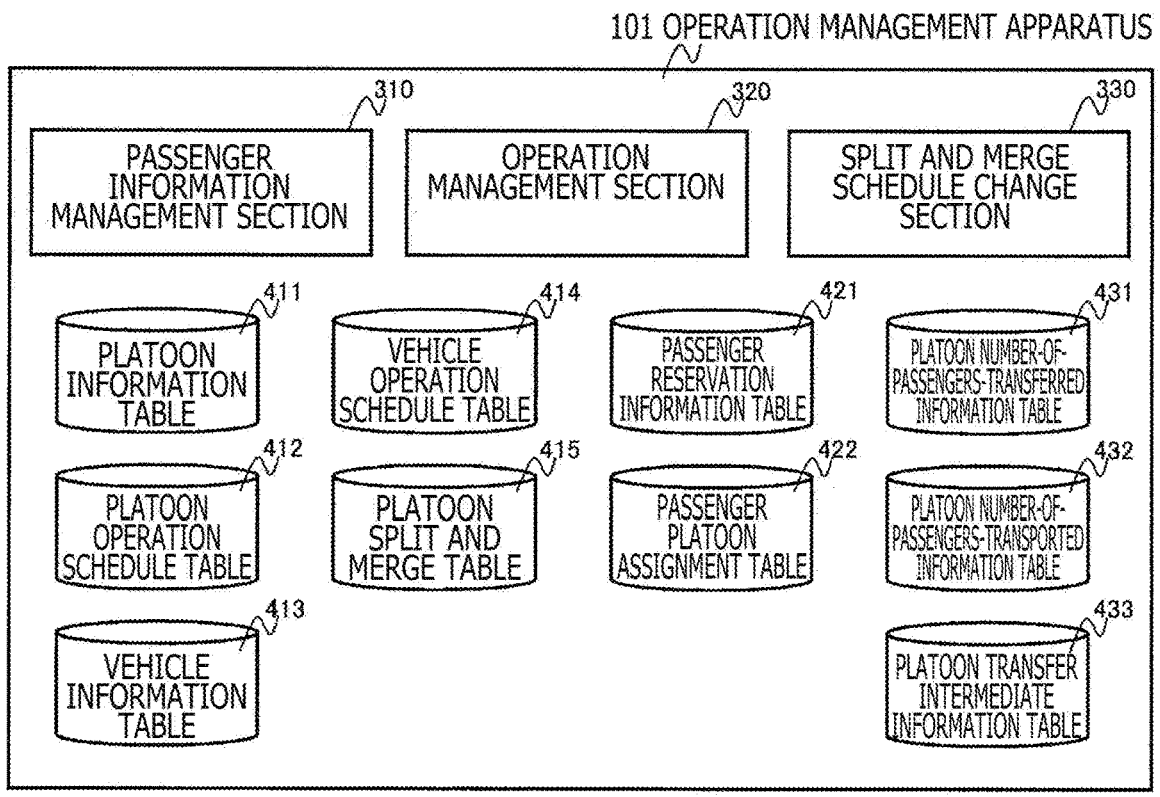

FIG.7

PLATOON INFORMATION TABLE 411

| PLATOON ID | LEADING VEHICLE | SUCCEEDING VEHICLE | CURRENT POSITION |
|---|---|---|---|
| PLATOON 211 | LEADING VEHICLE 111 | SUCCEEDING VEHICLE 121<br>SUCCEEDING VEHICLE 122<br>SUCCEEDING VEHICLE 123 | COORDINATE #1 |
| ... | ... | ... | ... |

FIG.8

PLATOON OPERATION SCHEDULE TABLE 412

| PLATOON SCHEDULE ID | PLATOON ID | DEPARTURE STATION | DEPARTURE TIME | ARRIVAL STATION | ARRIVAL TIME | OPERATION STATE |
|---|---|---|---|---|---|---|
| PLATOON SCHEDULE #1 | PLATOON 211 | STATION 201 | 10:00 | STATION 202 | 10:04 | OPERATION FINISHED |
| PLATOON SCHEDULE #2 | PLATOON 211 | STATION 202 | 10:05 | STATION 203 | 10:10 | OPERATION NOT STARTED |
| ... | ... | ... | ... | ... | ... | ... |

FIG. 9

VEHICLE INFORMATION TABLE 413

| VEHICLE ID | APPARATUS ADDRESS | VEHICLE TYPE | PASSENGER CAPACITY | WHEELCHAIR |
|---|---|---|---|---|
| LEADING VEHICLE 111 | 192.168.1.111 | LEADING VEHICLE | FIVE PASSENGERS | UNAVAILABLE |
| SUCCEEDING VEHICLE 121 | 192.168.1.121 | SUCCEEDING VEHICLE | SEVEN PASSENGERS | AVAILABLE |
| ... | ... | ... | ... | ... |

FIG. 10

VEHICLE OPERATION SCHEDULE TABLE 414

| VEHICLE SCHEDULE ID | VEHICLE ID | PLATOON SCHEDULE ID | OPERATION STATE |
|---|---|---|---|
| VEHICLE SCHEDULE #1 | SUCCEEDING VEHICLE 121 | PLATOON SCHEDULE #1 | OPERATION FINISHED |
| VEHICLE SCHEDULE #2 | SUCCEEDING VEHICLE 121 | PLATOON SCHEDULE #2 | OPERATION NOT STARTED |
| ... | ... | ... | ... |

FIG. 11

PLATOON SPLIT AND MERGE TABLE 415

| SPLIT AND MERGE ID | PLATOON ID | VEHICLE ID | STATION | CATEGORY | TIME |
|---|---|---|---|---|---|
| SPLIT AND MERGE #1 | PLATOON 211 | SUCCEEDING VEHICLE 122 | STATION 203 | SPLIT | 10:10 |
| SPLIT AND MERGE #2 | PLATOON 212 | SUCCEEDING VEHICLE 122 | STATION 203 | MERGE | 10:11 |
| ... | ... | ... | ... | ... | ... |

FIG. 12

PASSENGER RESERVATION INFORMATION TABLE 421

| PASSENGER RESERVATION ID | BOARDING STATION | EXITING STATION | DESIRED BOARDING TIME | ATTRIBUTE |
|---|---|---|---|---|
| PASSENGER RESERVATION #1 | STATION 201 | STATION 205 | 10:00 | NONE |
| PASSENGER RESERVATION #2 | STATION 203 | STATION 201 | 10:10 | WHEELCHAIR |
| ... | ... | ... | ... | ... |

FIG. 13

PASSENGER PLATOON ASSIGNMENT TABLE 422

| PLATOON ASSIGNMENT ID | PASSENGER RESERVATION ID | PLATOON SCHEDULE ID | STATUS | VEHICLE ID | VEHICLE DETERMINATION STATE |
|---|---|---|---|---|---|
| PLATOON ASSIGNMENT #1 | PASSENGER RESERVATION #1 | PLATOON SCHEDULE #1 | ON BOARD | LEADING VEHICLE 111 | DETERMINED |
| PLATOON ASSIGNMENT #2 | PASSENGER RESERVATION #1 | PLATOON SCHEDULE #2 | BOARDING CONTINUED | LEADING VEHICLE 111 | DETERMINED |
| ... | ... | ... | ... | ... | ... |

FIG. 14

PLATOON NUMBER-OF-PASSENGERS-TRANSFERRED INFORMATION TABLE 431

| PLATOON TRANSFER ID | STATION | TRANSFER SOURCE PLATOON | TRANSFER DESTINATION PLATOON | NUMBER OF PASSENGERS TRANSFERRED | TRANSFER LINK ID |
|---|---|---|---|---|---|
| PLATOON TRANSFER #1 | STATION 203 | PLATOON 212 | PLATOON 211 | 10 PASSENGERS | TRANSFER LINK #1 TRANSFER LINK #2 ... |
| PLATOON TRANSFER #2 | STATION 203 | PLATOON 211 | PLATOON 212 | 3 PASSENGERS | TRANSFER LINK #3 ... |
| ... | ... | ... | ... | ... | ... |

FIG. 15

PLATOON NUMBER-OF-PASSENGERS-TRANSPORTED INFORMATION TABLE 432

| PLATOON SCHEDULE ID | NUMBER OF PASSENGERS | PLATOON TRANSPORTATION CAPACITY |
|---|---|---|
| PLATOON SCHEDULE #1 | 15 PASSENGERS | 20 PASSENGERS |
| PLATOON SCHEDULE #2 | 13 PASSENGERS | 20 PASSENGERS |
| ... | ... | ... |

FIG. 16

PLATOON TRANSFER INTERMEDIATE INFORMATION TABLE 433

| TRANSFER LINK ID | TRANSFER SOURCE PLATOON ASSIGNMENT ID | TRANSFER DESTINATION PLATOON ASSIGNMENT ID |
|---|---|---|
| TRANSFER LINK #1 | PLATOON ASSIGNMENT #3 | PLATOON ASSIGNMENT #4 |
| TRANSFER LINK #2 | PLATOON ASSIGNMENT #5 | PLATOON ASSIGNMENT #6 |
| ... | ... | ... |

PLATOON TRAFFIC SYSTEM AND PLATOON TRAFFIC CONTROL METHOD

CROSS-REFERENCE TO RELATED APPLICATIONS

This application is a U.S. National Stage entry of PCT Application No: PCT/JP2018/019023 filed May 17, 2018, which claims priority to Japanese Patent Application No. 2017-144309, filed Jul. 26, 2017, the contents of which are incorporated herein by reference.

TECHNICAL FIELD

The present invention relates to operational management of a system in which a plurality of vehicles form a platoon through virtual coupling and travel on a track.

BACKGROUND ART

In a traffic system such as a high-speed railroad or an expressway bus that is based on seating, the maximum number of passengers that can board is limited by the number of seats. Thus, in a case where a fluctuation in demand or the like leads to concentration of reservations from a large number of passengers for the same route in the same time period, some of the passengers are disadvantageously not allowed to board due to full occupancy.

In regard to a railroad system, for example, Patent Document 1 discloses a technique by which, in a case where seats available are insufficient for boarding requests from users, an operation schedule is modified to increase the number of vehicles in the system, with seats assigned on the basis of the modified operation schedule. According to the technique described in Patent Document 1, sufficient seats can be made available even with concentration of reservations from a large number of passengers.

PRIOR ART DOCUMENT

Patent Document

Patent Document 1: JP-2002-207796-A

SUMMARY OF THE INVENTION

Problem to be Solved by the Invention

However, Patent Document 1 does not disclose a method for making sufficient vehicles available when the number of vehicles is increased. In a case where the number of spare vehicles is increased to provide for a fluctuation in demand, vehicle operational efficiency may be degraded. Thus, the technique has room for improvement in terms of efficient coping with a fluctuation in demand using a small number of vehicles.

An object of the present invention is to provide a platoon traffic system and a platoon traffic control method that are capable of efficiently utilizing a limited number of vehicles to cope with a fluctuating demand.

Means for Solving the Problem

A platoon traffic system according to an aspect of the present invention includes a plurality of platoons including vehicles on and from which passengers board and exit, and an operation management apparatus setting an operation schedule including assignment of the vehicles to the plurality of platoons and managing operation of the plurality of platoons. The vehicles in each of the platoons integrally operate in accordance with the operation schedule along a track including boarding and exiting points where passengers board and exit the vehicles, and addition and reduction of vehicles belonging to the platoon are enabled. The operation management apparatus accepts a boarding request for the vehicles, the request specifying the boarding and exiting points, and changes the operation schedule to reassign the vehicles belonging to the plurality of platoons, among the platoons on the basis of the boarding request and numbers of passengers allowed to board the vehicles.

Advantage of the Invention

According to the present invention, a vehicle scheduled to travel through a section with a low passenger demand can be reassigned to a platoon scheduled to travel through a section with a high passenger demand, allowing efficient passenger transportation to be implemented with a limited number of vehicles.

BRIEF DESCRIPTION OF THE DRAWINGS

FIG. 6 is a diagram illustrating a software configuration of the operation management apparatus illustrated in FIG. 1.

FIG. 7 is a diagram illustrating a data configuration example of a platoon information table illustrated in FIG. 6.

FIG. 8 is a diagram illustrating a data configuration example of a platoon operation schedule table illustrated in FIG. 6.

FIG. 9 is a diagram illustrating a data configuration example of a vehicle information table illustrated in FIG. 6.

FIG. 10 is a diagram illustrating a data configuration example of a vehicle operation schedule table illustrated in FIG. 6.

FIG. 11 is a diagram illustrating a data configuration example of a platoon split and merge table illustrated in FIG. 6.

FIG. 12 is a diagram illustrating a data configuration example of a passenger reservation information table illustrated in FIG. 6.

FIG. 13 is a diagram illustrating a data configuration example of a passenger platoon assignment table illustrated in FIG. 6.

FIG. 14 is a diagram illustrating a data configuration example of a platoon number-of-passengers-transferred information table illustrated in FIG. 6.

FIG. 15 is a diagram illustrating a data configuration example of a platoon number-of-passengers-transported information table illustrated in FIG. 6.

FIG. 16 is a diagram illustrating a data configuration example of a platoon transfer intermediate information table illustrated in FIG. 6.

MODES FOR CARRYING OUT THE INVENTION

First, a technique providing a background for a platoon traffic system according to the invention of the present application will be described in brief.

In recent years, advanced wireless communication technology has enabled electronic coupling of vehicles such as automobiles for synchronous traveling control. The use of such technology allows implementation of a platoon traffic system in which a plurality of vehicles form a platoon to transport passengers or freight. In the platoon traffic system, a leading vehicle is steered in a manned manner similarly to normal automobiles, while succeeding vehicles travel automatically following the leading vehicle and can thus be operated in an unmanned manner. In the platoon traffic system, a driver of the leading vehicle is responsible for recognition, determination, and control related to operation of the platoon. Thus, the platoon traffic system can be simplified compared to the automatic operation, solely by the vehicles, of an operation system of the succeeding vehicles.

An embodiment of the platoon traffic system implemented as described above will be described below with reference to the drawings.

Figure 1:
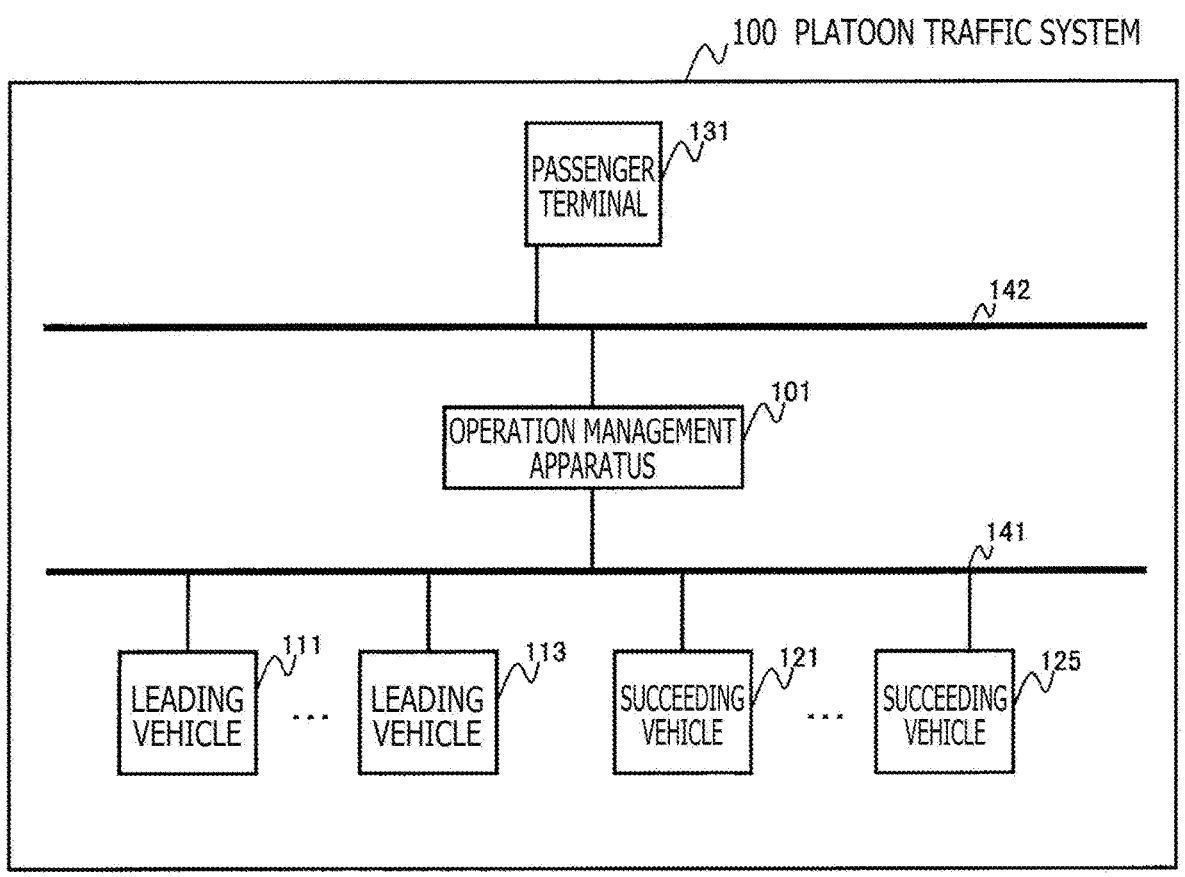
FIG. 1 is a diagram illustrating an embodiment of a platoon traffic system according to the present invention.

FIG. 1 is a diagram illustrating an embodiment of the platoon traffic system according to the present invention.

As illustrated in FIG. 1, a platoon traffic system 100 according to the present embodiment includes an operation management apparatus 101, leading vehicles 111 to 113 of platoons, succeeding vehicles 121 to 125 of the platoons, a passenger terminal 131, a communication transmission line 141 connecting the operation management apparatus 101 to the leading vehicles 111 to 113 of the platoons and succeeding vehicles 121 to 125 of the platoons, and a communication transmission line 142 connecting the operation management apparatus 101 and the passenger terminal 131.

The operation management apparatus 101 sets an operation schedule including assignment of the vehicles to a plurality of platoons and manages operation of the plurality of platoons.

The passenger terminal 131 can be operated by a passenger and may be a terminal installed in a station or a portable terminal such as a smartphone. Additionally, the communication transmission lines 141 and 142 are implemented by wireless networks using, for example, Wi-Fi.

The leading vehicles 111 to 113 are steered in a manned manner similarly to normal automobiles as described above, and are each coupled to any of the succeeding vehicles 121 to 125 in accordance with the operation schedule set by the operation management apparatus 101, to form a platoon and to serve as the leading vehicle of the platoon.

The succeeding vehicles 121 to 125 automatically travel to follow preceding vehicles in an unmanned manner as described above, and are coupled to any of the leading vehicles 111 to 113 in accordance with the operation schedule set by the operation management apparatus 101, to form platoons and to serve as the succeeding vehicles of the platoons.

Note that, in the present embodiment, three leading vehicles are provided but the number of leading vehicles is not limited to this value. The present embodiment is similarly applicable to one or more, general number of leading vehicles. This also applies to the succeeding vehicles and the passenger terminal.

Now, before detailed description of the platoon traffic system according to the present embodiment, brief description of operations and effects according to the invention of the present application will be given.

Figure 2:
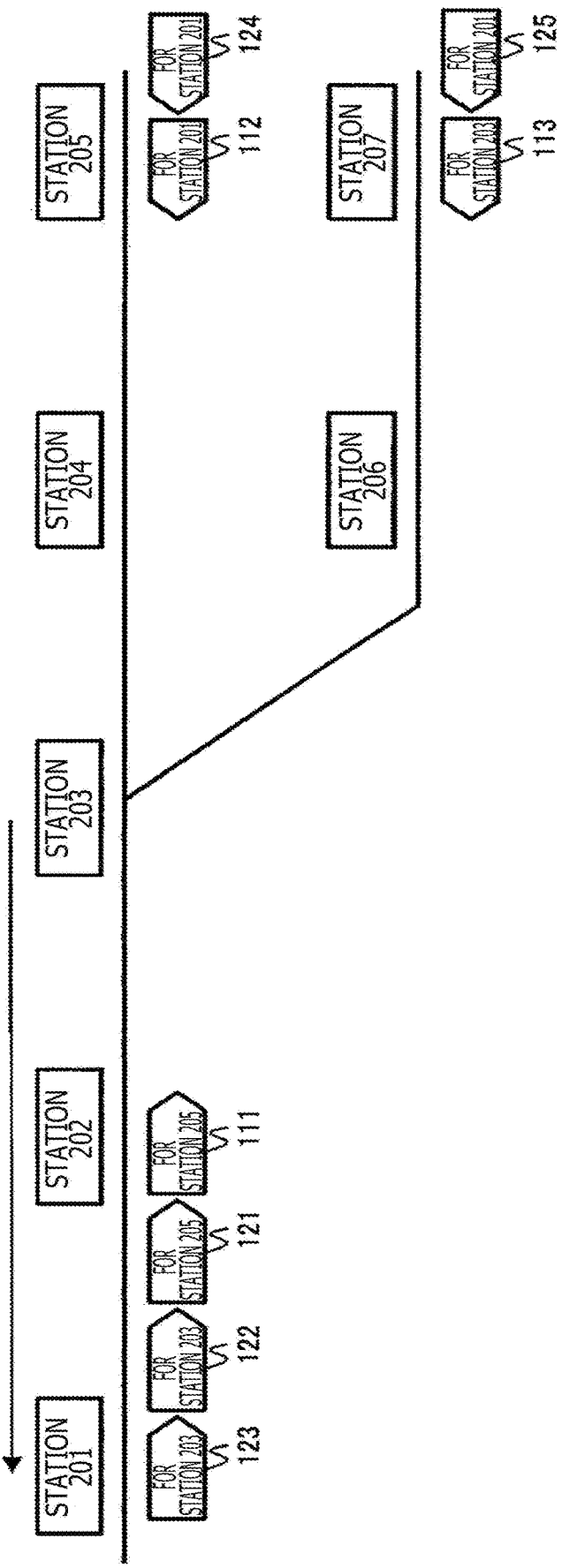
FIG. 2 is a diagram illustrating an example of operation of the platoon traffic system according to the present invention.
Figure 3:
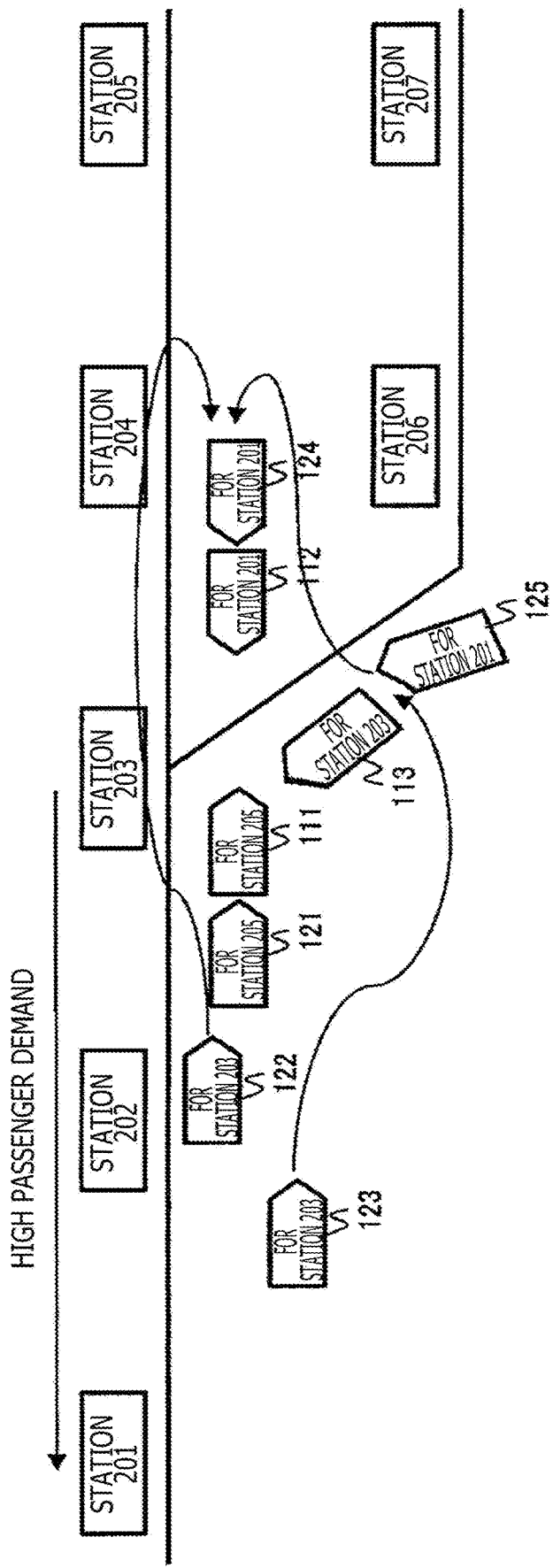
FIG. 3 is a diagram illustrating an example of operation of the platoon traffic system according to the present invention.
Figure 4:
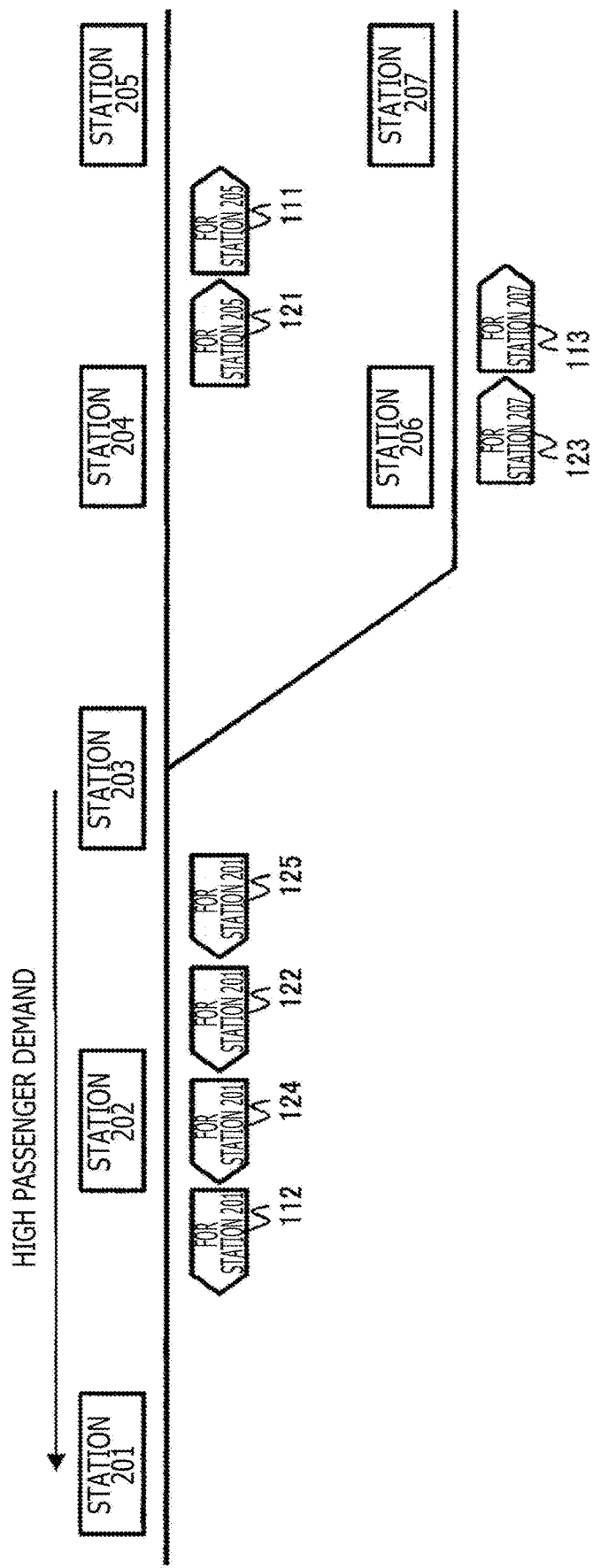
FIG. 4 is a diagram illustrating an example of operation of the platoon traffic system according to the present invention.

FIGS. 2 to 4 are diagrams illustrating an example of operation of the platoon traffic system according to the present invention. Note that FIG. 2, FIG. 3, and FIG. 4 are in time series order.

In the present example, an initial state of the platoon traffic system 100 is as illustrated in FIG. 2.

In the present example, stations 201 to 207 are installed as boarding and exiting points where platoons stop and where passengers board and exit vehicles. Additionally, as roads used as tracks on which the platoons operate, the following are installed: a road connecting the station 201 to the station 205 via the stations 202, 203, and 204 and a road connecting the station 203 to the station 207 via the station 206. The roads intersect at the station 203.

Additionally, the leading vehicle 111 couples to and is followed by the succeeding vehicles 121, 122, and 123 to form a platoon. The leading vehicle 112 couples to and is followed by the succeeding vehicle 124 to form a platoon. The leading vehicle 113 couples to and is followed by the succeeding vehicle 125 to form a platoon. In the present example, for simplification of description, each vehicle is assumed to be fully occupied. All the passengers in each vehicle are assumed to have the same destination. Passengers destined for the station 205 are assumed to be on the leading vehicle 111 and the succeeding vehicle 121. Passengers destined for the station 203 are assumed to be on the succeeding vehicles 122 and 123 and the leading vehicle 113. Passengers destined for the station 201 are assumed to be on the leading vehicle 112 and the succeeding vehicles 124 and 125. The platoon led by the leading vehicle 111 is assumed to be destined for the station 205. The platoon led by the leading vehicle 112 is assumed to be destined for the station 201. The platoon led by the leading vehicle 113 is assumed to be destined for the station 203. Each of the platoons is assumed to turn back, after arriving at the destination station, along the route through which the platoon has already traveled. Initial positions of the leading vehicles 111, 112, and 113 are assumed to be the stations 202, 205, and 207, respectively. Additionally, at the station 203, passengers destined for the station 201 are waiting for reservation of the platoon.

In a case where, after the elapse of time since the state illustrated in FIG. 2, each platoon reaches the vicinity of the station 203 as illustrated in FIG. 3, the passengers on the succeeding vehicle 125, who are destined for the station 201, need to transfer, at the station 203, from the platoon led by the leading vehicle 113 to the platoon destined for the station 201, in accordance with the original operation schedule.

In this case, in the present embodiment, the operation management apparatus 101 detects that passengers the number of which is equal to or larger than a preset threshold transfer from the platoon led by the leading vehicle 113 to the platoon led by the leading vehicle 112, and changes an operation schedule for the succeeding vehicle 125 such that, at the station 203, the succeeding vehicle 125 separates from the platoon led by the leading vehicle 113 and couples to the platoon led by the leading vehicle 112. Accordingly, the passengers on the succeeding vehicle 125 can move to the station 201 without any transfer, and a situation can be avoided where the passengers are precluded from transferring in a case where the platoon led by the leading vehicle 112 is fully occupied.

Additionally, in the state illustrated in FIG. 2, the platoon led by the leading vehicle 112 is fully occupied, and thus, the passengers traveling from the station 203 to the station 201 are precluded from boarding the platoon led by the leading vehicle 112.

In this case, in the present embodiment, the operation management apparatus 101 detects that the passengers on the succeeding vehicle 122 exit the vehicle at the station 203, and changes an operation schedule for the succeeding vehicle 122 such that, at the station 203, the succeeding vehicle 122 separates from the platoon led by the leading vehicle 111 and couples to the platoon led by the leading vehicle 112. Accordingly, the passengers destined for the station 201 and waiting for reservation at the station 203 can board the platoon led by the leading vehicle 112.

Furthermore, the succeeding vehicle 125 separates from the platoon led by the leading vehicle 113, and thus the number of vehicles belonging to the platoon led by the leading vehicle 113 decreases to one, corresponding to a very small passenger transportation capacity.

In this case, in the present embodiment, the operation management apparatus 101 detects that the transportation capacity of the platoon led by the leading vehicle 113 is equal to or smaller than a threshold, and changes an operation schedule for the succeeding vehicle 123 such that, at the station 203, the succeeding vehicle 123 separates from the platoon led by the leading vehicle 111 and couples to the platoon led by the leading vehicle 113. Accordingly, the platoon led by the leading vehicle 113 can maintain the minimum transportation capacity.

In a case where the operation schedules are changed as described above to reassign the vehicles among the platoons and the reassignment of the vehicles is completed, the platoon traffic system 100 is in a state illustrated in FIG. 4.

As described above, the leading vehicles 111 to 113 and the succeeding vehicles 121 to 125 form platoons in accordance with the operation schedules set by the operation management apparatus 101 and integrally operate in the respective platoons along the roads corresponding to the tracks including the stations 201 to 207 corresponding to the boarding and exiting points where the passengers board and exit the vehicles.

<Hardware Configuration>

A hardware configuration of the operation management apparatus 101 illustrated in FIG. 1 will be described below.

Figure 5:
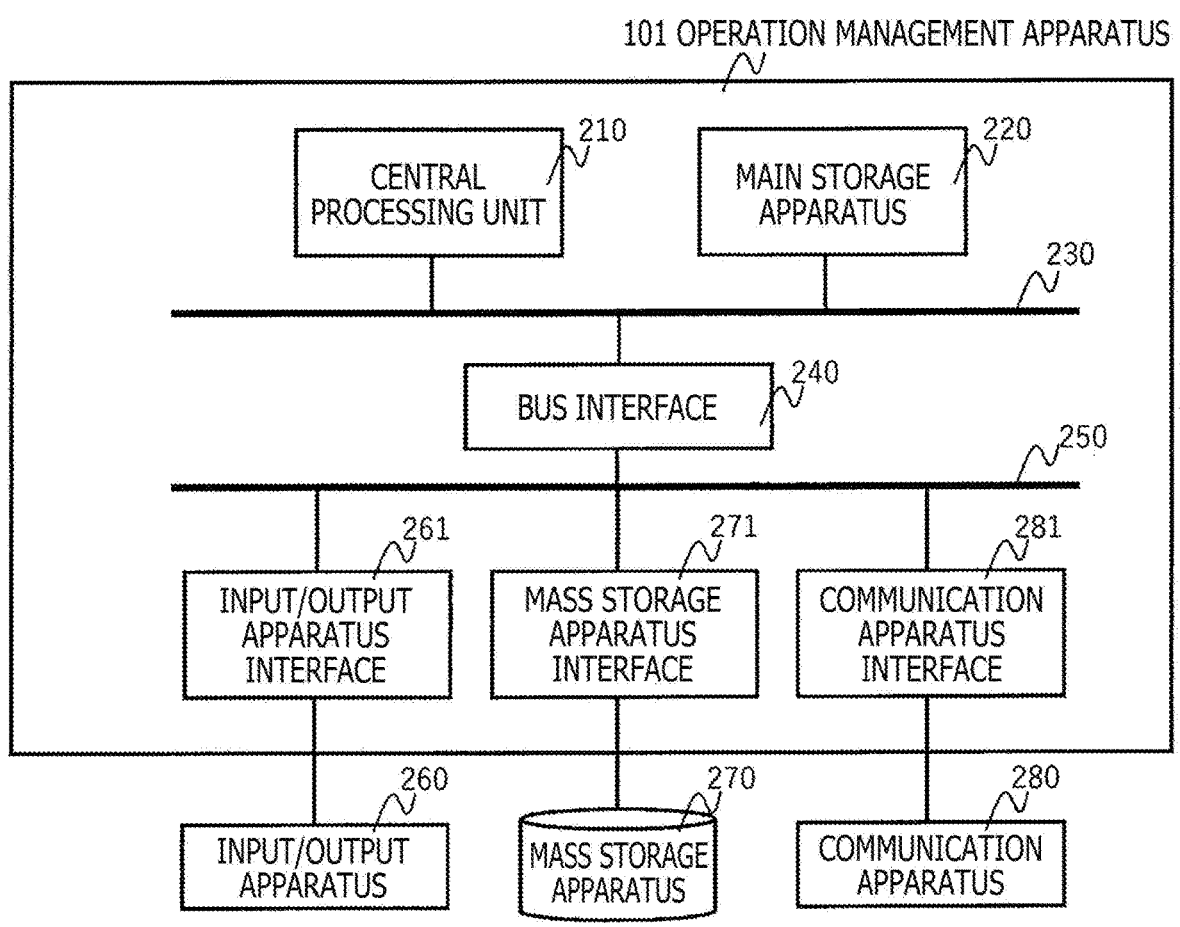
FIG. 5 is a diagram illustrating a hardware configuration of an operation management apparatus illustrated in FIG. 1.

FIG. 5 is a diagram illustrating the hardware configuration of the operation management apparatus 101 illustrated in FIG. 1.

Hardware of the operation management apparatus 101 illustrated in FIG. 1 includes a central processing unit 210, a main storage apparatus 220, an internal bus 230, a bus interface 240, an external bus 250, an input/output apparatus 260, an input/output apparatus interface 261, a mass storage apparatus 270, a mass storage apparatus interface 271, a communication apparatus 280, and a communication apparatus interface 281, as illustrated in FIG. 5.

The central processing unit 210 is a processor configured to perform operations such as program execution. The main storage apparatus 220 is used as a processing region during program execution and also as a temporary storage region for data used for transmission to and reception from the leading vehicles 111 to 113, the succeeding vehicles 121 to 125, and the passenger terminal 131, and stores a basic program, for example, an OS (Operating System), and basic data. The main storage apparatus 220 further temporarily stores, during program execution, programs and various tables used to implement software (a passenger information management section 310, an operation management section 320, and a split and merge schedule change section 330 (see FIG. 6)) provided in the operation management apparatus 101.

The central processing unit 210 is connected to the main storage apparatus 220 by the internal bus 230. The internal bus 230 is connected to the external bus 250 via the bus interface 240.

The input/output apparatus 260 includes interface devices for a user such as a display, a keyboard, and a mouse, and a drive apparatus capable of writing and reading data to and from external media. The user can control execution of programs using the interface devices such as a keyboard and a mouse.

The mass storage apparatus 270 is an apparatus such as an HDD (Hard Disk Drive) or an SSD (Solid State Drive) and can permanently store the basis program, processing results, programs implementing the passenger information management section 310, the operation management section 320, and the split and merge schedule change section 330. During execution of various types of processing, the central processing unit 210 accesses the mass storage apparatus 270 and reads the programs into the main storage apparatus 220 for execution.

The communication apparatus 280 is an apparatus configured to connect to an external apparatus using, for example, Wi-Fi and allows input and output of information between the operation management apparatus 101 and other apparatuses through a network. The use of the communication apparatus 280 enables transmission and reception of information to and from the leading vehicles 111 to 113, the succeeding vehicles 121 to 125, and the passenger terminal 131.

The input/output apparatus 260, the mass storage apparatus 270, and the communication apparatus 280 are connected to the external bus 250 via the input/output apparatus interface 261, the mass storage apparatus interface 271, and the communication apparatus interface 281, respectively. A configuration including the input/output apparatus 260, the mass storage apparatus 270, and the communication apparatus 280 may be designated as the operation management apparatus 101.

<Software Configuration and Table Configuration>

A software configuration of the operation management apparatus 101 illustrated in FIG. 1 will be described below.

FIG. 6 is a diagram illustrating the software configuration of the operation management apparatus 101 illustrated in FIG. 1.

Software of the operation management apparatus 101 illustrated in FIG. 1 includes at least the passenger information management section 310, the operation management section 320, and the split and merge schedule change section 330, as illustrated in FIG. 6. Each of the sections will be described below in detail. Additionally, the operation management apparatus 101 includes at least a platoon information table 411, a platoon operation schedule table 412, a vehicle information table 413, a vehicle operation schedule table 414, a platoon split and merge table 415, a passenger reservation information table 421, a passenger platoon assignment table 422, a platoon number-of-passengers-transferred information table 431, a platoon number-of-passengers-transported information table 432, and a platoon transfer intermediate information table 433.

FIG. 7 is a diagram illustrating a data configuration example of the platoon information table 411 illustrated in FIG. 6.

The platoon information table 411 is a table used to manage information related to the configuration and state of each platoon in the platoon traffic system 100.

As illustrated in FIG. 7, for the platoon information table 411, one record is created for each platoon. Each record in the platoon information table 411 includes fields labeled platoon ID, leading vehicle, succeeding vehicle, and current position. The platoon ID indicates an identifier of the platoon. Additionally, the leading vehicle is an identifier of a vehicle leading the platoon. In addition, in the succeeding vehicle, identifiers of all the vehicles belonging to the platoon other than the leading vehicle are stored. Additionally, the current position indicates the position of the leading vehicle of the platoon, and in the current position, information is stored that can uniquely specify the position of the platoon, for example, map coordinate information or a distance from a reference station. The example illustrated in FIG. 7 represents that the platoon 211 includes the leading vehicle 111 and the succeeding vehicles 121 to 123, and the current position of the platoon 211 is indicated by a coordinate #1.

FIG. 8 is a diagram illustrating a data configuration example of the platoon operation schedule table 412 illustrated in FIG. 6.

The platoon operation schedule table 412 is a table used to manage the operation schedule for each platoon. As illustrated in FIG. 8, the platoon operation schedule table 412 includes records each of which is created for a corresponding operation schedule from the start of a platoon at a certain station until the arrival of the platoon at the next station. The example in FIG. 8 illustrates a platoon schedule #1 indicating a schedule from the start of the platoon 211 at the station 201 until the arrival of the platoon 211 at the station 202 and a platoon schedule #2 indicating a schedule from the start of the platoon 211 at the station 202 until the arrival of the platoon 211 at the station 203. The platoon operation schedule table 412 includes fields labeled platoon schedule ID, platoon ID, departure station, departure time, arrival station, arrival time, and operation state. The platoon schedule ID indicates an identifier of each record. Additionally, the platoon ID is an identifier of a platoon. In addition, the departure station is the departure station of the platoon. Additionally, the departure time is the time when the platoon leaves the departure station. In addition, the arrival station is the arrival station of the platoon. Additionally, the arrival time is the time when the platoon arrives at the arrival station. In addition, the operation state indicates a state where the platoons travel in accordance with the operation schedule, and has, as values, for example, "operation finished," "in operation," and "operation not started." The example in FIG. 8 represents that, as a platoon schedule #1, a platoon schedule is set specifying that the platoon 211 leaves the station 201 at 10:00 and arrives at the station 202 at 10:04, and the example also represents that the platoon 211 has already finished the operation. The example also represents that, as a platoon schedule #2, a platoon schedule is set specifying that the platoon 211 leaves the station 202 at 10:05 and arrives at the station 203 at 10:10, and further represents that the platoon 211 has not started the operation yet. A combination of the platoon operation schedule table 412 and the platoon information table 411 indicates that the platoon 211 operated in accordance with the platoon schedules #1 and #2 includes the leading vehicle 111 and the succeeding vehicles 121 to 123.

FIG. 9 is a diagram illustrating a data configuration example of the vehicle information table 413 illustrated in FIG. 6.

The vehicle information table 413 is a table used to manage information related to all of the leading vehicles and the succeeding vehicles in the platoon traffic system 100. As illustrated in FIG. 9, for the vehicle information table 413, one record is created for each of the leading vehicles and the succeeding vehicles. The vehicle information table 413 includes fields labeled vehicle ID, apparatus address, vehicle type, passenger capacity, and wheelchair. The vehicle ID indicates an identifier of the vehicle. Additionally, the apparatus address is an address used for communication between the operation management apparatus 101 and the vehicle. For example, in a case where an IP communication is adopted as a communication scheme, this value corresponds to an IP address. For example, in the example illustrated in FIG. 9, an IP address "192.168.1.111" is assigned to the leading vehicle 111. Additionally, the vehicle type indicates the type of a vehicle. In the vehicle type, for example, a value such as leading vehicle or succeeding vehicle is stored. In addition, the passenger capacity indicates the maximum number of passengers that can board the vehicle. Additionally, the wheelchair indicates whether the vehicle is equipped to allow boarding of wheelchairs. Note that the vehicle information table 413 may additionally include fields related to any other vehicle attribute information such as a female-only vehicle or a multilingual guidance-enabled vehicle on which assignment of passengers to the vehicles is based.

FIG. 10 is a diagram illustrating a data configuration example of the vehicle operation schedule table 414 illustrated in FIG. 6.

The vehicle operation schedule table 414 is a table used to manage the operation schedule for each vehicle. In the platoon traffic system 100, each vehicle inevitably belongs to one of the platoons during traveling. Thus, in the present embodiment, the operation schedule for the vehicle is expressed by linking the vehicle with a record in the platoon operation schedule table 412. As illustrated in FIG. 10, for the vehicle operation schedule table 414, one record is created for each schedule from the departure of a vehicle from a certain station until the arrival of the vehicle at the next station. The vehicle operation schedule table 414 includes fields labeled vehicle schedule ID, vehicle ID, platoon schedule ID, and operation state. The vehicle schedule ID indicates the identifier of each record. Additionally, the vehicle ID is the identifier of the vehicle. In addition, the platoon schedule ID is the identifier of each record in the platoon operation schedule table 412. Additionally, the operation state indicates a state where the vehicle travels in accordance with the operation schedule, and has, as values, for example, "operation finished," "in operation," and "operation not started." In the example illustrated in FIG. 10, a vehicle operation schedule #1 indicates that the succeeding vehicle 121 travels in accordance with the platoon schedule #1. In the platoon operation schedule table 412, the platoon schedule #1 indicates a schedule from the departure of the platoon 211 from the station 201 until the arrival of the platoon 211 at the station 202. This indicates that the succeeding vehicle 121 belongs to the platoon 211 during traveling through a section from the station 201 to the station 202. Additionally, the operation state is operation finished, indicating that the succeeding vehicle 121 has already completed traveling in accordance with the operation schedule indicated by the present record.

FIG. 11 is a diagram illustrating a data configuration example of the platoon split and merge table 415 illustrated in FIG. 6.

The platoon split and merge table 415 is a table used to manage a schedule for splitting a platoon and separating a vehicle from the platoon and a schedule for merging a vehicle with a platoon. For the platoon split and merge table 415, one record is created for each schedule for splitting and merging of the platoon, as illustrated in FIG. 11. The platoon split and merge table 415 includes fields labeled split and merge ID, platoon ID, vehicle ID, station, category, and execution time. The split and merge ID indicates the identifier of each record. Additionally, the platoon ID is the identifier of the platoon for splitting or merging. In addition, the vehicle ID is the identifier of the vehicle to be split from the platoon by splitting or the vehicle to be merged with the platoon. Additionally, the station is a station where splitting or merging is performed. In addition, the category indicates whether splitting or merging is performed. Additionally, the execution time is the time when splitting or merging is performed. In the example illustrated in FIG. 11, a split and merge #1 indicates that the platoon 211 disconnects from the succeeding vehicle 122 at the station 203, and a split and merge #2 indicates that the platoon 212 merges with the succeeding vehicle 122 at the station 203. The platoon split and merge table 415 can be created by integrating information included in the platoon operation schedule table 412 with information included in the vehicle operation schedule table 414. For example, in a case where, for two platoon schedules involving the same succeeding vehicle as that indicated in the vehicle operation schedule table 414, the platoon operation schedule table 412 indicates different platoons, the succeeding vehicle is to be split from or merged with one of the platoons at a station common to the two platoons.

FIG. 12 is a diagram illustrating a data configuration example of the passenger reservation information table 421 illustrated in FIG. 6.

The passenger reservation information table 421 is a table used to manage passenger reservation information received from the passenger terminal. As illustrated in FIG. 12, for the passenger reservation information table 421, one record is created for each passenger reservation. The passenger reservation information table 421 includes fields labeled passenger reservation ID, boarding station, exiting station, desired boarding time, and attribute. The passenger reservation ID indicates an identifier of each passenger reservation. Additionally, the boarding station is a station where a passenger having made a reservation boards a vehicle. In addition, the exiting station is a station where the passenger having made a reservation exits the vehicle. Additionally, the desired boarding time is a time when the passenger desires to board the vehicle at the boarding station. In addition, the attribute is passenger attribute information used to assign the passenger to a vehicle, for example, whether the passenger desires to use a wheelchair or not. Note that, in a case where information such as sex and a passenger guidance language that is needed to be considered in assignment of the passenger to a vehicle, the number of types of values may be appropriately increased. In the example illustrated in FIG. 12, a passenger reservation #1 indicates a reservation for boarding the vehicle at 10:00 at the station 201 and exiting the vehicle at the station 205, and a passenger reservation #2 indicates a reservation for boarding the vehicle at 10:10 at the station 203 and exiting the vehicle at the station 201.

FIG. 13 is a diagram illustrating a data configuration example of the passenger platoon assignment table 422 illustrated in FIG. 6.

The passenger platoon assignment table 422 is a table indicating when a passenger is to board and which platoon and which vehicle the passenger is to board. As illustrated in FIG. 13, for the passenger platoon assignment table 422, one record is created for each combination of a record of passenger reservation in the passenger reservation information table 421 and a record of platoon schedule in the platoon operation schedule table 412. The passenger platoon assignment table 422 includes fields labeled platoon assignment ID, passenger reservation ID, platoon schedule ID, status, vehicle ID, and vehicle determination state. The platoon assignment ID is the identifier of each record. Additionally, the passenger reservation ID is an identifier of each record in the passenger reservation information table 421. In addition, the platoon schedule ID is an identifier for the platoon operation schedule table 412. Additionally, the status indicates the status of assignment of a passenger to a platoon and includes at least four types of values "on board," "boarding continued," "reservation determined," and "tentative reservation." Additionally, the vehicle ID is the identifier of each record in the vehicle information table 413. In a case where the vehicle on which the passenger is to board has not been determined yet, a blank is stored in the vehicle ID. In addition, the vehicle determination state indicates whether or not the passenger has been determined to board the vehicle indicated by the vehicle ID. In the example illustrated in FIG. 13, the platoon schedules #1 and #2 are assigned to the passenger reservation #1 indicated in the passenger reservation information table 421. For the platoon schedule #1, the example represents that the passenger has been determined to board the leading vehicle 111 (see the platoon information table 411) belonging to the platoon 211 (see the platoon operation schedule table 412) operated in accordance with the platoon schedule #1, and is already on board. Additionally, for the platoon schedule #2, the example indicates that the passenger has been determined to remain on the leading vehicle 111 (see the platoon information table 411) belonging to the platoon 211 (see the platoon operation schedule table 412) operated in accordance with the platoon schedule #2 but that the status is boarding continued because the platoon 211 has not started the operation yet.

FIG. 14 is a diagram illustrating a data configuration example of the platoon number-of-passengers-transferred information table 431 illustrated in FIG. 6.

The platoon number-of-passengers-transferred information table 431 is a table indicating the number of passengers transferred between two platoons at each station. For the platoon number-of-passengers-transferred information table 431, as illustrated in FIG. 14, one record is created for each set of two platoons between which transfer takes place and a station where the transfer takes place. The platoon number-of-passengers-transferred information table 431 includes fields labeled platoon transfer ID, station, transfer source platoon, transfer destination platoon, number of passengers transferred, and transfer link D. The platoon transfer ID indicates the identifier of each record. Additionally, the station is a station where transfer takes place. In addition, the transfer source platoon is the platoon from which the passengers exit for transfer. Additionally, the transfer destination platoon is the platoon on which the transferring passengers board. In addition, the number of passengers transferred is the number of passengers transferred from the transfer source platoon to the transfer destination platoon. Here, when a vehicle is reassigned from the transfer source platoon to the transfer destination platoon, that is, when the platoon to which the vehicle belongs is changed, passengers moving between the platoons while remaining on the vehicle are not included in the number of passengers transferred. Additionally, the transfer link ID is the identifier of each record in the platoon transfer intermediate information table 433. The example illustrated in FIG. 14 indicates that ten passengers transfer at the station 203 from the platoon 212 to the platoon 211, and in contrast, three passengers transfer at the station 203 from the platoon 211 to the platoon 212.

FIG. 15 is a diagram illustrating a data configuration example of the platoon number-of-passengers-transported information table 432 illustrated in FIG. 6.

For the platoon number-of-passengers-transported information table 432, as illustrated in FIG. 15, one record is created for each record in the platoon operation schedule table 412. The platoon number-of-passengers-transported information table 432 includes fields labeled platoon schedule ID, number of passengers, and platoon transportation capacity. The platoon schedule ID is the identifier of each record in the platoon operation schedule table 412. Additionally, the number of passengers indicates the number of passengers boarding the platoon indicated by the platoon schedule ID in the section indicated by the platoon schedule ID. Additionally, the platoon transportation capacity indicates the maximum number of passengers that can board the platoon indicated by the platoon schedule ID in the section indicated by the platoon schedule ID. In the present embodiment, the number of vehicles belonging to a platoon increases or decreases due to split and merge, and thus the platoon may have a transportation capacity varying with the section through which the platoon travels. In the example illustrated in FIG. 15, for the platoon schedule #1, the number of passengers is 15 and the maximum transportation capacity is 20 passengers. The records related to the platoon schedule #1 in the platoon operation schedule table 412 indicate that the platoon 211 can accommodate up to 20 passengers in the section from the station 201 to the station 202 but that the number of passengers actually scheduled to board the platoon 211 is 15.

FIG. 16 is a diagram illustrating a data configuration example of the platoon transfer intermediate information table 433 illustrated in FIG. 6.

The platoon transfer intermediate information table 433 is a table representing transfer of passengers at stations. For the platoon transfer intermediate information table 433, one record is created for one transfer of each passenger as illustrated in FIG. 16. The platoon transfer intermediate information table 433 includes fields labeled transfer link ID, transfer source platoon assignment ID, and a transfer destination platoon assignment ID. The transfer link ID indicates the identifier of each record. Additionally, the transfer source platoon assignment ID and the transfer destination platoon assignment ID are the identifiers of records in the passenger platoon assignment table 422.

<Flow of Processing>

A platoon traffic control method in the operation management apparatus 101 illustrated in FIG. 1 will be described below. Various operations corresponding to an operation method of the operation management apparatus 101 described below are implemented by a program read into a memory or the like for execution by the operation management apparatus 101. The program includes codes for performing various operations described below.

Figure 17:
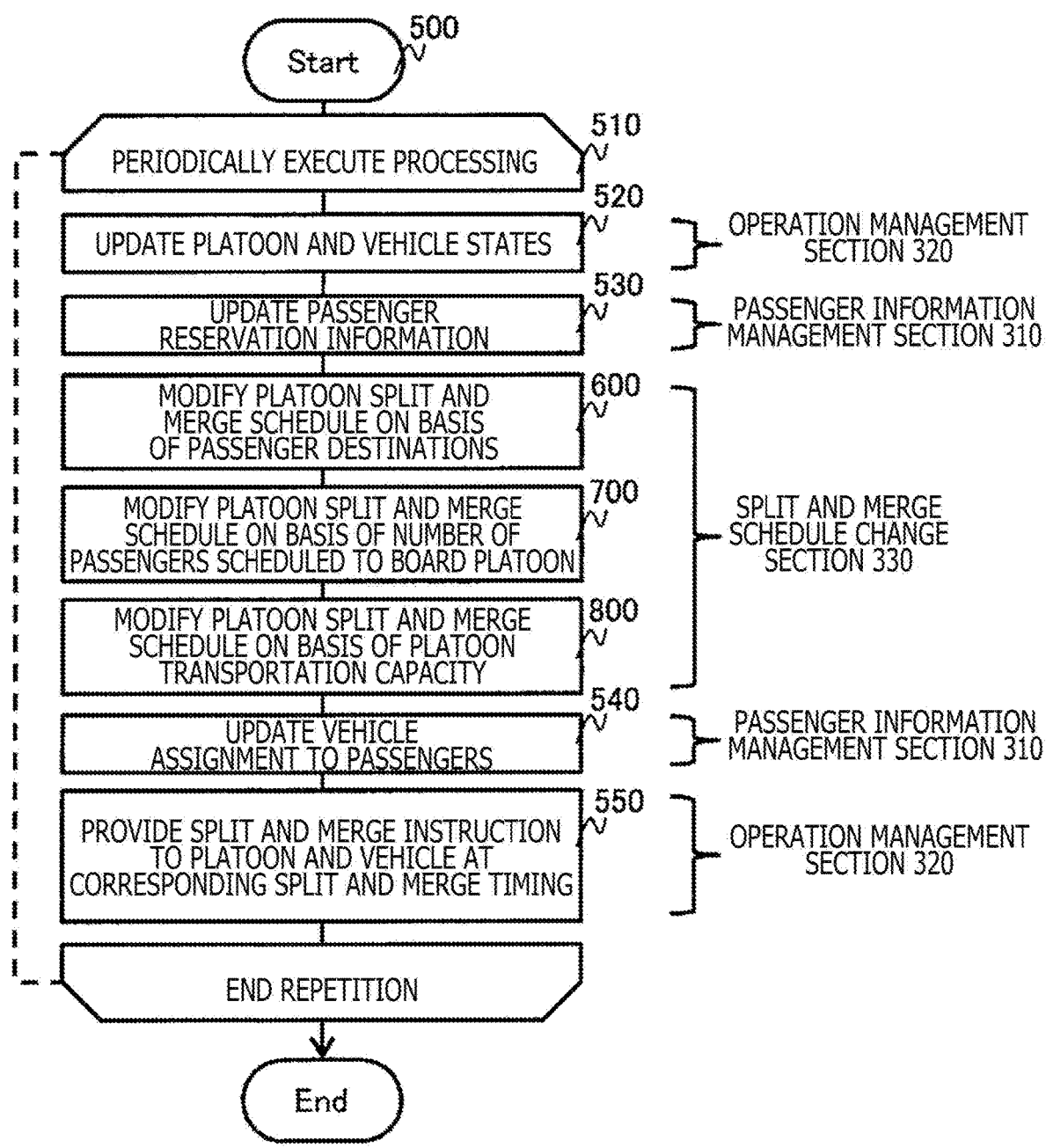
FIG. 17 is a flowchart illustrating a flow of processing executed when the operation management apparatus illustrated in FIG. 1 updates a split and merge schedule for platoons.

FIG. 17 is a flowchart illustrating a flow of processing executed when the operation management apparatus 101 illustrated in FIG. 1 updates a split and merge schedule for platoons. Note that the split and merge schedule is a part of an operation schedule for platoons set by the operation management apparatus 101 to change the assignment of a vehicle to a platoon.

After being started up, the operation management apparatus 101 starts processing 500 when a program for executing updating processing for the split and merge schedule for platoons is initiated, and executes processing 510, processing 520, processing 530, processing 600, processing 700, processing 800, processing 540, and processing 550.

The processing 510 includes repeatedly executing the processing 520, the processing 530, the processing 600, the processing 700, the processing 800, the processing 540, and the processing 550. The repetition is periodically performed at predefined time intervals, for example, ten seconds.

The processing 520 includes updating the states of platoons and vehicles in accordance with the current operation status of the platoon traffic system 100, and is executed by the operation management section 320.

In the processing 520, the operation management section 320 updates the platoon information table 411 and the platoon operation schedule table 412. The update of the platoon information table 411 can be implemented as processing of adding, for example, when merging of a vehicle with a platoon is completed, the identifier of the merged vehicle to the succeeding vehicle field in the platoon information table 411 and then reflecting position information received from the leading vehicle of the platoon in the current position field. The update of the platoon operation schedule table 412 can be implemented, for example, as processing of comparing the current position in the platoon information table 411 between the last state and the current state and updating the operation state from operation not started to in operation or from in operation to operation finished. Additionally, when receiving, from the operator, a change instruction for the departure time due to road congestion or the like, the operation management apparatus 101 executes processing of reflecting the change instruction in the platoon operation schedule table 412.

The processing 530 includes updating and aggregating passenger reservation information and is executed by the passenger information management section 310.

In the processing 530, the passenger information management section 310 reflects, in the passenger reservation information table 421, passenger reservation information received from the passenger terminal 131 and subsequently updates each of the passenger platoon assignment table 422, the platoon number-of-passengers-transferred information table 431, and the platoon number-of-passengers-transported information table 432.

An updating procedure for the passenger platoon assignment table 422 executed in the passenger information management section 310 will be described below.

First, the statuses of all the records in the passenger platoon assignment table 422 are updated. In the update of the status, in a case where a record with the corresponding platoon schedule ID in the platoon operation schedule table 412 includes the status of in operation, the status is set to on board, and the vehicle determination state is set to determined. Additionally, in a case where, for a passenger having a record in the passenger platoon assignment table 422, the passenger platoon assignment table 422 includes any other record indicating the same passenger reservation ID and vehicle ID as those of the passenger and including the status of on board, the passenger remains on the same vehicle in the next section indicated in another platoon schedule, and the status is set to boarding continued. In a case where the corresponding record in the platoon operation schedule table 412 includes the status of operation finished, the record in the passenger platoon assignment table 422 is deleted.

Then, newly added records are extracted from the records in the passenger reservation information table 421.

Then, for each of the extracted records, a group of records is extracted from the platoon operation schedule table 412 in accordance with a platoon operation schedule extraction procedure described below.

Then, for each set of the record extracted from the platoon operation schedule table 412 and the record from the passenger reservation information table 421, a corresponding record is additionally created for the passenger platoon assignment table 422. For the additionally created record, the identifier of the record in the platoon operation schedule table 412 is set in the platoon schedule ID, the identifier of the record in the passenger reservation information table 421 is set in the passenger reservation ID, the tentative reservation is set in the status, and not determined is set in the vehicle determination state. The platoon assignment ID may be set to an optional value not the same as the values of the platoon assignment IDs in the other records. Additionally, the vehicle ID may be blanked.

Now, the platoon operation schedule extraction procedure will be described below.

First, records indicating that the operation state is operation not started are extracted from the records in the platoon operation schedule table 412.

Then, those of the extracted records which indicate the same departure station and the same arrival station are grouped.

Then, records with the earliest departure time are extracted from each group.

Then, each of the record groups obtained is designated as a node, and a directed link from each node is provided to another node with a departure station that is the same as the arrival station of the former node, thus generating a directed graph.

Then, all paths are extracted along which the exiting station in the passenger reservation information table 421 is reached by following the directed links forward from a node for which the departure station corresponds to the boarding station in the passenger reservation information table 421.

Then, one of the extracted paths is selected that includes the smallest number of nodes on the path.

Finally, the records corresponding to the nodes on the path are extracted.

An update procedure for the platoon number-of-passengers-transferred information table 431 executed in the passenger information management section 310 will be described below.

First, all records are deleted from the platoon number-of-passengers-transferred information table 431 and the platoon transfer intermediate information table 433.

Then, each of the records in the passenger platoon assignment table 422 is designated as a node. With reference to the platoon operation schedule table 412, a directed link from each node is provided to another node with a departure station having the same platoon schedule ID as that of the arrival station of the former node, thus generating a directed graph.

Then, those of the directed links are extracted each of which includes a start point node in which the platoon ID of the platoon schedule is different from the platoon ID of the platoon schedule for a corresponding end point node.

Then, for each of the extracted directed links, a record for the platoon transfer intermediate information table 433 is created. At this time, the transfer link ID in the record is set to an optional value that is not the same as any of the corresponding values in the other records. The identifier of the start point node is set in the transfer source platoon assignment ID, and the identifier of the end point node is set in the transfer destination platoon assignment ID.

Then, with reference to the vehicle operation schedule table 414 and the passenger platoon assignment table 422, those of the records in the platoon transfer intermediate information table 433 are extracted in which the vehicle ID of the transfer source platoon assignment ID is different from the vehicle ID of the transfer destination platoon assignment ID.

Finally, the records in the platoon number-of-passengers-transferred information table 431 corresponding to the extracted records are updated. In the corresponding records, the arrival station of the transfer source platoon assignment ID is the same as the station, the platoon ID of the transfer source platoon assignment ID matches the transfer source platoon, and the platoon ID of the transfer destination platoon assignment ID matches the transfer destination platoon. The update of each record can be achieved by adding one to the number of passengers transferred in the corresponding record. Note that, with no corresponding record, a new record is added to the platoon number-of-passengers-transferred information table 431. In this case, the number of passengers transferred is set to one.

An update procedure for the platoon number-of-passengers-transported information table 432 executed in the passenger information management section 310 will be described.

First, all records are deleted from the platoon number-of-passengers-transported information table 432.

Then, records with the same platoon schedule IDs as those of the records in the platoon operation schedule table 412 are added to the platoon number-of-passengers-transported information table 432. At this time, the platoon transportation capacity and the number of passengers in the record are each set to zero as an initial value.

Then, the platoon transportation capacity is set for each of the records in the platoon number-of-passengers-transported information table 432. The platoon transportation capacity can be calculated by first searching the platoon information table 411 for corresponding records, then extracting, from the vehicle information table 413, records corresponding to the vehicles individually set as the leading and succeeding vehicles, and finally summing the number of passengers set in the passenger capacity in each of the extracted records.

Finally, the number of passengers is set for each of the records in the platoon number-of-passengers-transported information table 432. The number of passengers can be calculated as the sum of all the records in the passenger platoon assignment table 422 having the same platoon schedule ID.

The processing 600, the processing 700, and the processing 800 are executed by the split and merge schedule change section 330.

The processing 600 will be described below in detail.

Figure 18:
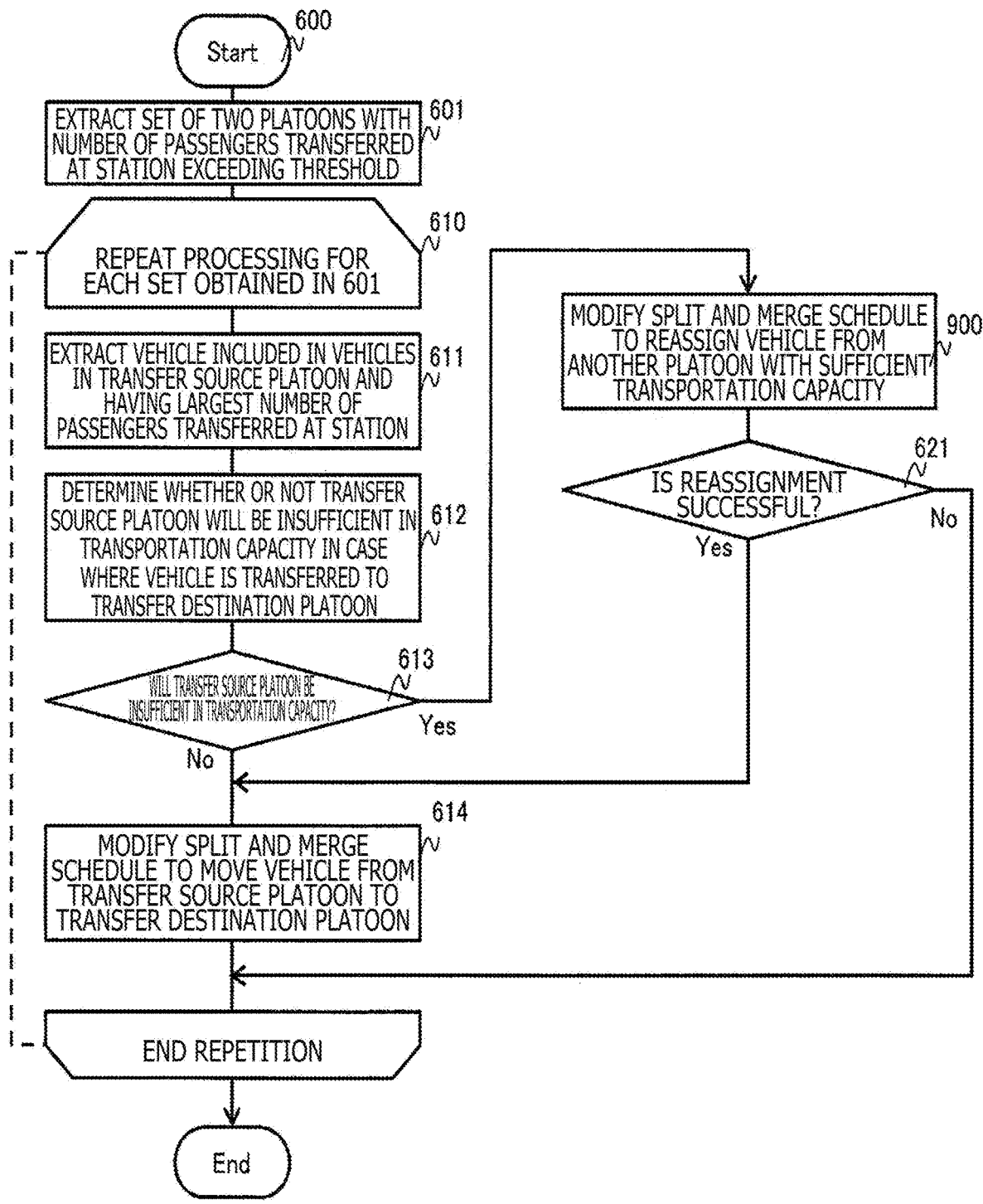
FIG. 18 is a flowchart illustrating a flow of processing 600 illustrated in FIG. 17.

FIG. 18 is a flowchart illustrating a flow of the processing 600 illustrated in FIG. 17.

The processing 600 is intended to change a split and merge schedule for a platoon on the basis of the destination of passengers.

Processing 601 includes extracting a set of two platoons in which the number of passengers transferred at a station is larger than a threshold. The present processing can be achieved by extracting, from the platoon number-of-passengers-transferred information table 431, records in which the number of passengers transferred is larger than the threshold. Note that the threshold may be determined, for example, by multiplying an average value of boarding capacities of the vehicles by a coefficient such as 0.5. Alternatively, the threshold may be determined by calculating an average number of boarding passengers for the vehicles from log data related to past transportation status and multiplying the resultant value by, for example, 1.2. In this case, the average number of boarding passengers may be calculated for each transportation section or each time period.

Processing 610 includes repeatedly executing processing 611, processing 612, processing 613, processing 614, processing 900, and processing 621 on each of the records extracted in the processing 601.

The processing 611 includes selecting a vehicle as a candidate for splitting, from a transfer source platoon in a record for repetition. The vehicle as a candidate for splitting may be, for example, a vehicle with the largest number of boarding passengers transferred at a station where the splitting takes place. Alternatively, the vehicle as a candidate for splitting may be a vehicle with the largest value resulting from subtraction of the number of boarding passengers not transferred at the station where the split takes place from the number of boarding passengers transferred at the station where the split takes place. Alternatively, the vehicle as a candidate for splitting may be a vehicle in which the number of boarding passengers not transferred at the station where the split takes place is zero. Alternatively, the vehicle as a candidate for splitting may be determined on the basis of a numerical value resulting from a certain arithmetic operation performed on the number of boarding passengers transferred at the station where the split takes place and the number of boarding passengers not transferred at the station where the split takes place.

For each vehicle, the number of passengers transferred at the station where the split takes place and the number of passengers not transferred at the station where the split takes place can be aggregated by tracking related data, starting from the transfer link ID in the platoon number-of-passengers-transferred information table 431, in the platoon transfer intermediate information table 433 and the passenger platoon assignment table 422.

Note that vehicles for which splitting is not desired may be preliminarily excluded from candidates. The vehicles for which splitting is not desired are vehicles for which the splitting results in a need for a change in the vehicle ID in the record for which the vehicle determination state in the passenger platoon assignment table 422 is determined.

The processing 612 includes checking whether or not the transfer source platoon will be insufficient in transportation capacity in a case where the vehicle obtained in the processing 611 is reassigned from the transfer source platoon to the transfer destination platoon. In this case, for example, the platoon information table 411 may be updated in accordance with the vehicle configurations of the platoons resulting from the reassignment of the vehicle, the platoon number-of-passengers-transported information table 432 may then be updated in accordance with the above-described update procedure for the platoon number-of-passengers-transported information table 432, and whether or not the platoon transportation capacity in the platoon number-of-passengers-transported information table 432 is smaller than the number of passengers may finally be determined.

The processing 613 includes branching the processing flow in accordance with the result of the determination in the processing 612. In a case where the processing 613 results in the determination that the reassignment of the vehicle does not lead to an insufficient transportation capacity of the transfer source platoon, the processing 614 is executed. Otherwise the processing 900 is executed.

The processing 614 includes changing or modifying the split and merge schedule such that the vehicle obtained in the processing 611 is reassigned from the transfer source platoon to the transfer destination platoon. In the processing 614, the contents of update of the platoon information table 411 and the above-described platoon number-of-passengers-transported information table 432 performed in the processing 612 are established, and the vehicle operation schedule table 414 and the passenger platoon assignment table 422 are updated.

An update procedure for the vehicle operation schedule table 414 will be described below.

First, those of the records in the vehicle operation schedule table 414 are all deleted which include the vehicle ID of the vehicle obtained in the processing 611 and the platoon schedule ID of the schedule resulting from the reassignment of the vehicle.

Then, records including the schedule for the transfer destination platoon and resulting from the reassignment of the vehicle are extracted from the platoon operation schedule table 412.

Then, for each of the extracted records, the corresponding record is added to the vehicle operation schedule table 414. For the added records, the vehicle schedule ID is set to an optional value not the same as any of the corresponding values in the other records, the vehicle ID is set to correspond to the vehicle obtained in the processing 611, and the platoon schedule ID is set equal to the identifier in the corresponding record in the platoon operation schedule table 412, and the operation state is set to operation not started.

An update procedure for the passenger platoon assignment table 422 will be described below.

First, records related to passengers on the reassigned vehicle at the time of the reassignment are updated. In this case, for those of the records related to the passengers which include a range of platoon schedule ID from the current ID back to the ID set immediately after the reassignment, the vehicle ID may be set to correspond to the vehicle obtained in the processing 611, the vehicle determination state may be set to determined, and the status may be set to boarding continued.

Then, in a case where the number of passengers on board at the time of the reassignment of the vehicle is smaller than the passenger capacity of the vehicle, then for records related to passengers transferred at the station where reassignment of the vehicle takes place and including the status of reservation determined and including the range of platoon schedule IDs from the current ID back to the ID set immediately after the reassignment of the vehicle, the vehicle ID is set to correspond to the vehicle obtained in the processing 611 and the vehicle determination state is set to determined, to the extent that the passenger capacity is not exceeded.

The processing 900 is executed in a case where the transfer source platoon will be insufficient in transportation capacity after reassignment of a vehicle in the processing 613. In the processing 900, the split and merge schedule is modified such that a vehicle is reassigned from another platoon sufficient in transportation capacity. The processing 900 will be described below in detail. When the processing 600 invokes the processing 900, for example, the following criterion for determining the insufficiency of the transportation capacity is provided: "the number of passengers in the platoon number-of-passengers-transported information table 432 is larger than the platoon transportation capacity."

The processing 621 includes branching the processing flow in accordance with the result of the processing 900. In a case where the processing 900 results in successful vehicle reassignment, the processing 614 is executed. Otherwise, the next repetition of the processing 610 is executed.

With the above-described series of processing, in a case where excess passengers beyond the number-of-passengers threshold for a vehicle belonging to a certain platoon are destined for a boarding and exiting point not covered by the operation schedule for the platoon, the vehicle is reassigned to a platoon passing through the boarding and exiting point. This allows many passengers to reach the destination without transferring to another vehicle.

The processing 900 will be described below in detail.

Figure 19:
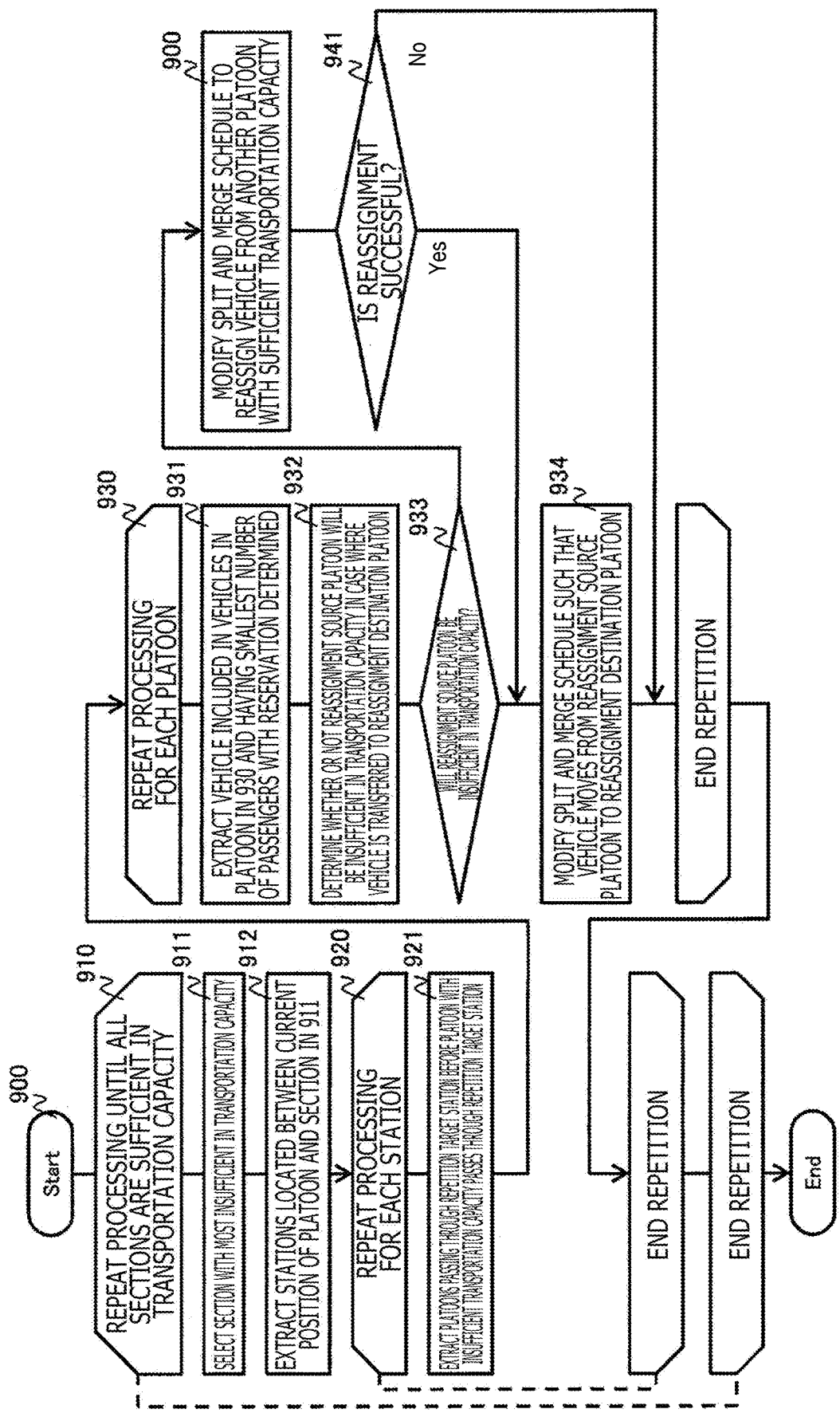
FIG. 19 is a flowchart illustrating a flow of processing 900 illustrated in FIG. 18.

FIG. 19 is a flowchart illustrating a flow of the processing 900 illustrated in FIG. 18.

The processing 900 includes executing processing 910, processing 911, processing 912, processing 920, processing 921, processing 930, processing 931, processing 932, processing 933, processing 934, the processing 900, and processing 941. In this case, when the processing 900 is executed, a criterion for determining the insufficiency of the transportation capacity is received from invocation source processing.

The processing 910 includes repeatedly executing the processing 911, the processing 912, the processing 920, the processing 921, the processing 930, the processing 931, the processing 932, the processing 933, the processing 934, the processing 900, and the processing 941 until no section is insufficient in transportation capacity. Here, whether or not any section is insufficient in transportation capacity is determined in accordance with the criterion for determining the insufficiency of the transportation capacity, the criterion having been received from the invocation source processing.

The processing 911 includes selecting a section where the platoon is most insufficient in transportation capacity. As also described in the processing 910, the selection is performed in accordance with the criterion for determining the insufficiency of the transportation capacity, the criterion having been received from the invocation source processing.

The processing 912 includes extracting stations located between the current position of the platoon and a section insufficient in transportation capacity. The extraction of stations may be achieved, for example, by searching the platoon operation schedule table 412 for a record with the platoon schedule ID corresponding to the section insufficient in transportation capacity and sequentially taking out arrival stations from a platoon schedule from the platoon schedule ID corresponding to the currently traveling platoon to the record with the platoon schedule ID found.

The processing 920 includes repeatedly executing the processing 921, the processing 930, the processing 931, the processing 932, the processing 933, the processing 934, the processing 900, and the processing 941 on each of the stations extracted in the processing 912.

The processing 921 includes extracting platoons passing through the repetition target station in the processing 920 before the platoon insufficient in transportation capacity. The extraction can be achieved by referencing the arrival station and the arrival time in the platoon operation schedule table 412.

The processing 930 includes repeatedly executing the processing 931, the processing 932, the processing 933, the processing 934, the processing 900, and the processing 941 on each of the platoons extracted in the processing 921.

The processing 931 includes extracting one of the vehicles belonging to the repletion target platoon in the processing 930 that has the smallest number of passengers with determined reservations in the section through which the vehicle travels after passing the station in the processing 920. The extraction can be achieved, for example, by grouping, according to the vehicle ID, the records in the passenger platoon assignment table 422 corresponding to the above-described section and platoon and determining the vehicle ID of a group including the smallest number of records with the vehicle determination state set to determined.

The processing 932 includes determining whether or not the platoon in the processing 930 will be insufficient in transportation capacity in a case where the vehicle extracted in the processing 931 is transferred to the platoon insufficient in transportation capacity. The determination can be achieved by means similar to the means in the above-described processing 612.

The processing 933 includes branching the processing flow in accordance with the result of the determination in the processing 932. In a case where the processing 932 results in the determination that the platoon in the processing 930 will not be insufficient in transportation capacity even after the vehicle is reassigned, the processing 934 is executed. Otherwise the processing 900 is executed.

The processing 934 includes modifying the split and merge schedule such that the vehicle extracted in the processing 931 moves from the platoon in the processing 930 to a reassignment destination platoon. The modification can be achieved by means similar to the means in the above-described processing 614.

The processing 941 includes branching the processing flow in accordance with the result of the determination in the processing 900. In a case where the processing 900 results in successful vehicle reassignment, the processing 934 is executed. Otherwise the next repetition in the processing 930 is performed.

The processing 700 will be described below in detail.

Figure 20:
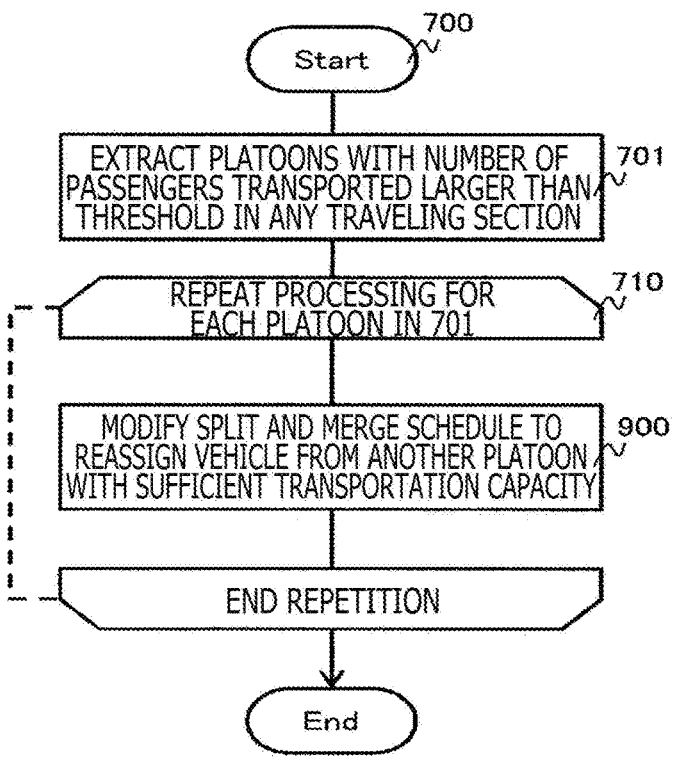
FIG. 20 is a flowchart illustrating a flow of processing 700 illustrated in FIG. 17.

FIG. 20 is a flowchart illustrating a flow of the processing 700 illustrated in FIG. 17.

The processing 700 includes executing processing 701, processing 710, and the processing 900.

The processing 701 includes extracting platoons in which the number of passengers transported is larger than a threshold in any of the traveling sections. The processing 701 can be achieved, for example, by extracting, from the platoon number-of-passengers-transported information table 432, the platoon schedule IDs in records in which the ratio between the number of passengers and the platoon transportation capacity is higher than a first threshold, and using the platoon operation schedule table 412 to obtain platoon IDs on the basis of the platoon schedule IDs. The threshold may be a constant, for example, 0.9.

The processing 710 includes repeatedly executing the above-described processing 900 on each of the platoons obtained in the processing 701. When the processing 700 invokes the processing 900, as a criterion for determining the insufficiency of transportation capacity, the same criterion as that in the processing 701 is provided.

Then, in the processing 900, a vehicle belonging to another platoon sufficient in transportation capacity, for example, a platoon in which the number of passengers scheduled for boarding is smaller than a second threshold is merged with the platoon extracted in the processing 701.

With the above-described series of processing, in a case where the number of passengers scheduled to board a certain platoon is larger than a threshold, a vehicle belonging to a platoon in which the number of passengers scheduled for boarding is smaller than the threshold is reassigned to the platoon in which the number of passengers scheduled for boarding is larger than the threshold. This allows effective utilization of vehicles in a platoon with obviously many unoccupied seats.

The processing 800 will be described below in detail.

Figure 21:
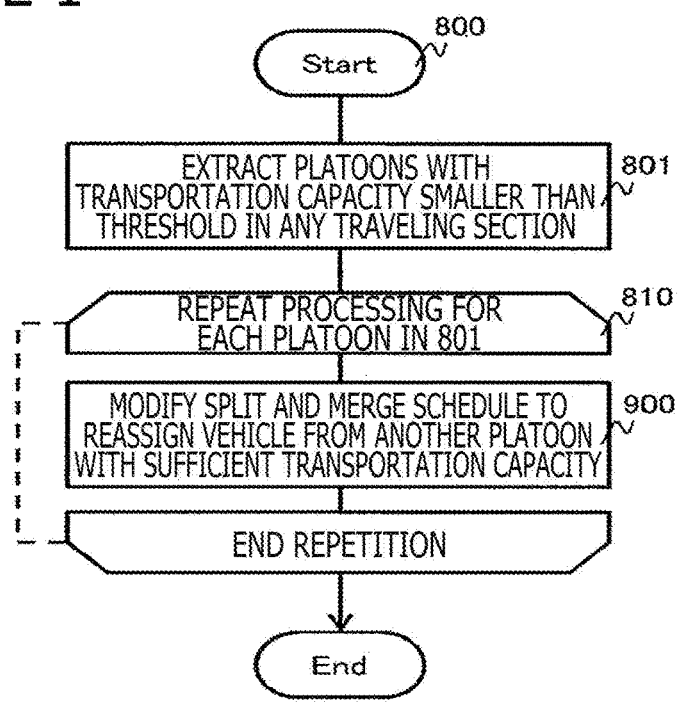
FIG. 21 is a flowchart illustrating a flow of processing 800 illustrated in FIG. 17.

FIG. 21 is a flowchart illustrating a flow of the processing 800 illustrated in FIG. 17.

The processing 800 includes executing processing 801, processing 810, and the processing 900.

The processing 801 includes extracting platoons having a platoon transportation capacity smaller than a third threshold in any of the traveling sections. The processing 801 can be achieved, for example, by extracting, from the platoon number-of-passengers-transported information table 432, platoon schedule IDs in records in which the platoon transportation capacity has a value smaller than or equal to a threshold, and using the platoon operation schedule table 412 to obtain platoon IDs on the basis of the platoon schedule IDs. The transportation capacity corresponding to the third threshold may be a constant, for example, ten. Alternatively, as the third threshold, an average passenger capacity of the platoons multiplied by a coefficient such as 0.3 may be used.

The processing 810 includes repeatedly executing the above-described processing 900 on each of the platoons obtained in the processing 801. When the processing 800 invokes the processing 900, as a criterion for determining the insufficiency of transportation capacity, the same criterion as that in the processing 801 is provided.

Then, in the processing 900, a vehicle belonging to another platoon sufficient in transportation capacity, for example, a platoon with a transportation capacity larger than a fourth threshold, is merged with the platoon extracted in the processing 801.

With the above-described series of processing, in a case where a certain platoon has a transportation capacity smaller than the third threshold, a vehicle belonging to a platoon with a transportation capacity larger than the fourth threshold is reassigned to the platoon with a transportation capacity smaller than the third threshold. This avoids a decrease in transportation capacity, preventing a situation that passengers cannot board vehicles in a platoon with the desired destination.

Thus, the processing executed by the split and merge schedule change section 330 is ended to modify the split and merge schedule of platoons on the basis of the number of passengers transferred at the station, the number of passengers waiting for reservations, and the number of passengers corresponding to unoccupied seats in the vehicle.

FIG. 17 will be described again. After the processing executed by the split and merge schedule change section 330 is ended, a shift to the processing 540 is performed.

The processing 540 includes updating assignment of vehicles to passengers and is executed by the passenger information management section 310.

First, in the processing 540, the passenger information management section 310 extracts, from the passenger platoon assignment table 422, records including the status of tentative reservation. Records with tentative reservation indicate that a reservation has been accepted but that a vehicle for boarding has not been determined yet.

Then, for these records, the status is shifted to reservation determined sequentially in order of registration in the passenger platoon assignment table 422 starting with the earliest registration. However, in a case where the number of passengers on the platoon is larger than the maximum transportation capacity, the status is not changed. The reservation determined indicates that the vehicle for boarding has been determined and that the vehicle ID has been set as described below.

Then, records with the vehicle ID field left blank are extracted from the passenger platoon assignment table 422.

Then, the vehicle ID is set for each of the records. The set vehicle ID may correspond to, for example, one of the vehicles constituting the platoon on which a passenger boards, the vehicle still including unoccupied seats and including the largest number of boarding passengers with the same destination as that of this passenger. The passengers with the same destination may board the same vehicle. Alternatively, a plurality of destinations may be grouped according to a heading direction, and the passengers belonging to the same group may be accommodated in the same vehicles. The arrangement of stations illustrated in FIG. 2 is taken as an example. For example, passengers destined for the station 202 via the station 203 and passengers destined for the station 201 via the station 203 may be included in a group for the same heading direction. A method for determining the groups may include, for example, dividing the stations into major stations and the other stations, creating directed links each linking two adjacent major stations, and considering, for passengers with destinations on the directed link, a station corresponding to the end point of the directed link to be representatively the destination of the passengers. Alternatively, the assigned vehicle may be determined on the basis of passenger attributes and vehicle attributes, for example, by assigning wheelchaired passengers to vehicles equipped to accommodate wheelchairs. Note that, as candidates for the major stations, junction stations, transfer stations, stations where many passengers board and exit, and the like may be set. As described above, grouping passengers with the same destination allows the passengers to reach the destinations with few transfers.

The processing 550 includes providing a split and merge instruction to a platoon and vehicles at the corresponding split and merge timing, and is executed by the operation management section 320.

First, in the processing 550, the operation management section 320 deletes all records from the platoon split and merge table 415.

Then, the vehicle operation schedule table 414 is divided into groups according to the vehicle ID.

Then, each group is rearranged in order of operation.

Then, for two adjacent records with different assigned platoons, records for the platoon split and merge table 415 are newly created. Note that, when the platoon to which the vehicle belongs is changed, splitting and merging are performed, and thus two records are created for the platoon split and merge table 415.

Then, from the records in the platoon split and merge table 415, records indicating that the current time has passed the execution time are extracted.

Finally, a split or merge instruction is transmitted via the communication apparatus 280 to the platoon and vehicles indicated by the extracted records.

Each of the vehicles constituting the platoon receives the instruction from the operation management apparatus 101 and performs control such as coupling to another vehicle to re-configure the platoon or decoupling the vehicle.

<Effects of Invention>

As described above, according to the present embodiment, vehicles belonging to a plurality of platoons are reassigned among the platoons on the basis of requests from passengers to board the vehicles and the number of passengers that can board the vehicles. Thus, even with a fluctuation in transportation demand, a limited number of vehicles can be efficiently utilized and the passengers can be assigned to the appropriate vehicles in accordance with the reservation status and the boarding status. Furthermore, by modifying the platoon split and merge schedule, the vehicles can be flexibly reassigned among the platoons. This allows elimination of inefficient utilization of the vehicles in which, in certain sections, passengers are waiting for boarding, whereas, in other sections, obviously many seats are unoccupied in the vehicles.

Additionally, flexible distribution of transportation capacity can be achieved even at the time of a fluctuation in demand, enabling a reduction in the total number of vehicles and in the number of spare vehicles. This significantly reduces costs of introduction and operation of the platoon traffic system.

Furthermore, passengers precluded from boarding due to full occupation are reduced, thus shortening the waiting time of the passengers to significantly improve the convenience for the passengers. In addition, in a case where the passengers in a vehicle have the same destination, the vehicle can be reassigned among a plurality of platoons, thus allowing the passengers to reach the destination with few transfers.

Note that the present invention is not limited to the above-described embodiment but may be appropriately changed without departing from the spirits of the present invention. For example, the present embodiment has been described taking, as an example, the configuration in which the platoon traffic system 100 includes three leading vehicles and five succeeding vehicles. However, similar descriptions apply even to a case where the platoon traffic system includes an optional number of leading vehicles and an optional number of succeeding vehicles. Also, for the passenger terminal, the platoon traffic system may include an optional number of passenger terminals.

Additionally, the platoon traffic system is merely an embodiment of the present invention. In the embodiment of the present invention, automobiles are electronically coupled together. However, the automobiles may be physically coupled together or moving bodies other than the automobiles may be used. The transportation target is also not limited to passengers, and the present invention can be widely used to transport freight.

REFERENCE SIGNS LIST

100: Platoon traffic system
101: Operation management apparatus
111 to 113: Leading vehicle
121 to 125: Succeeding vehicle
131: Passenger terminal
141, 142: Communication transmission line
201 to 207: Station
210: Central processing unit
220: Main storage apparatus
230: Internal bus
240: Bus interface
250: External path
260: Input/output apparatus
261: Input/output apparatus interface
270: Mass storage apparatus
271: Mass storage apparatus interface
280: Communication apparatus
281: Communication apparatus interface
310: Passenger information management section
320: Operation management section
330: Split and merge schedule change section
411: Platoon information table
412: Platoon operation schedule table
413: Vehicle information table
414: Vehicle operation schedule table
415: Platoon split and merge table
421: Passenger reservation information table
422: Passenger platoon assignment table
431: Platoon number-of-passengers-transferred information table
432: Platoon number-of-passengers-transported information table
433: Platoon transfer intermediate information table

The invention claimed is:

1. A platoon traffic system comprising:
a plurality of platoons including vehicles on and from which passengers board and exit; and
an operation management apparatus setting an operation schedule including assignment of the vehicles to the plurality of platoons and managing operation of the plurality of platoons, wherein
the vehicles in each of the platoons integrally operate in accordance with the operation schedule along a track including boarding and exiting points where passengers board and exit the vehicles, and addition and reduction of vehicles belonging to the platoon are enabled,
the operation management apparatus accepts a boarding request for the vehicles, the request specifying the boarding and exiting points, and changes the operation schedule to reassign the vehicles belonging to the plurality of platoons, among the platoons on a basis of the boarding request and numbers of passengers allowed to board the vehicles, and,
when passengers a number of which is larger than a number-of-passengers threshold for a first vehicle belonging to a first platoon are destined for a boarding and exiting point not passed through in accordance with an operation schedule for the first platoon, the operation management apparatus changes assignment of the first vehicle to a second platoon passing through the boarding and exiting point.

2. The platoon traffic system according to claim 1, wherein
in a case where a number of passengers scheduled to board vehicles in a first platoon is larger than a first threshold, the operation management apparatus changes, to the first platoon, assignment of a vehicle belonging to a second platoon in which a number of passengers scheduled to board the second platoon is smaller than a second threshold.

3. The platoon traffic system according to claim 1, wherein in a case where a transportation capacity of a first platoon is smaller than a third threshold, the operation management apparatus changes, to the first platoon, assignment of a vehicle belonging to a second platoon with a transportation capacity larger than a fourth threshold.

4. The platoon traffic system according to claim 1, wherein the operation management apparatus sets the operation schedule such that passengers having an identical destination board an identical vehicle.

5. A platoon traffic control method for controlling platoon traffic in which vehicles on and from which passengers board and exit travel while constituting a plurality of platoons, wherein the vehicles in each of the platoons integrally operate in accordance with an operation schedule along a track including boarding and exiting points where passengers board and exit the vehicles, and addition and reduction of vehicles belonging to the platoon are enabled, an operation management apparatus setting the operation schedule including assignment of the vehicles to the plurality of platoons and managing operation of the plurality of platoons accepts a boarding request for the vehicles, the request specifying the boarding and exiting points, and changes the operation schedule to reassign the vehicles belonging to the plurality of platoons, among the platoons on a basis of the boarding request and numbers of passengers allowed to board the vehicles, and, when passengers a number of which is larger than a number-of-passengers threshold for a first vehicle belonging to a first platoon are destined for a boarding and exiting point not passed through in accordance with an operation schedule for the first platoon, the operation management apparatus changes assignment of the first vehicle to a second platoon passing through the boarding and exiting point.

6. The platoon traffic control method according to claim 5, wherein in a case where a number of passengers scheduled to board vehicles in a first platoon is larger than a first threshold, the operation management apparatus changes, to the first platoon, assignment of a vehicle belonging to a second platoon in which a number of passengers scheduled to board the second platoon is smaller than a second threshold.

7. The platoon traffic control method according to claim 5, wherein in a case where a transportation capacity of a first platoon is smaller than a third threshold, the operation management apparatus changes, to the first platoon, assignment of a vehicle belonging to a second platoon with a transportation capacity larger than a fourth threshold.

8. The platoon traffic control method according to claim 5, wherein the operation management apparatus sets the operation schedule such that passengers having an identical destination board an identical vehicle.

* * * * *